(12) United States Patent
Van Tiem et al.

(10) Patent No.: US 8,541,924 B2
(45) Date of Patent: Sep. 24, 2013

(54) STATOR ASSEMBLY HAVING A PHASE-TO-PHASE INSULATOR, AND A METHOD OF ASSEMBLING A STATOR ASSEMBLY

(75) Inventors: Ryan Van Tiem, Rochester Hills, MI (US); Edward L. Kaiser, Orion, MI (US); John C. Morgante, Sterling Heights, MI (US); Paul F. Turnbull, Canton, MI (US); Michael C. Muir, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 318 days.

(21) Appl. No.: 13/013,943

(22) Filed: Jan. 26, 2011

(65) Prior Publication Data

US 2012/0187797 A1    Jul. 26, 2012

(51) Int. Cl.
*H02K 3/34* (2006.01)
(52) U.S. Cl.
USPC ......................................................... 310/215

(58) Field of Classification Search
USPC ................................. 310/215, 214, 216.105
See application file for complete search history.

(56) References Cited

U.S. PATENT DOCUMENTS

| 5,892,312 | A | 4/1999 | Hazelton et al. |
| 7,479,716 | B2 | 1/2009 | El-Antably et al. |
| 7,538,457 | B2 | 5/2009 | Holmes et al. |
| 7,868,495 | B2 * | 1/2011 | Chamberlin et al. ........... 310/71 |
| 8,373,316 | B2 * | 2/2013 | Beatty et al. .................... 310/54 |
| 2004/0100154 | A1 | 5/2004 | Rahman et al. |
| 2009/0289520 | A1 * | 11/2009 | Takeshita et al. ............. 310/214 |

* cited by examiner

*Primary Examiner* — Nguyen N Hanh
(74) *Attorney, Agent, or Firm* — Quinn Law Group, PLLC

(57) ABSTRACT

An insulator assembly for a stator assembly of an electric machine includes an annular ring attached to a stator core, and a plurality of coil separators supported by the annular ring and extending from the annular ring axially along a longitudinal axis. One of the coil separators is disposed between each adjacent pair of the coils to prevent contact between adjacent coils having a different electrical phase. The coil separators are slideably inserted between the adjacent pairs of coils, with the annular ring positioning and supporting the coil separators.

10 Claims, 3 Drawing Sheets

STATOR ASSEMBLY HAVING A PHASE-TO-PHASE INSULATOR, AND A METHOD OF ASSEMBLING A STATOR ASSEMBLY

TECHNICAL FIELD

The invention generally relates to a stator assembly for an electric machine. More specifically the invention relates to an insulator assembly for a stator assembly and a method of assembling the stator assembly.

BACKGROUND

Multi-phase electric machines, including but not limited to electric motors and/or electric generators, include a plurality of coils disposed radially about and equidistant from a longitudinal axis. The each adjoining pair of coils is configured to operate at a different electrical phase. Adjacent coils of differing electrical phases must maintain a minimum separation and not come in contact with each other to avoid a phase-to-phase short.

SUMMARY

A stator assembly for an electric machine is provided. The stator assembly includes a stator core extending along and concentric about a longitudinal axis. A plurality of coils is supported by the stator core. The plurality of coils is disposed radially about and equidistant from the longitudinal axis, and extends along the longitudinal axis. Each adjacent pair of the plurality of coils is spaced from each other and is configured for a different electrical phase. The stator assembly includes an insulator assembly having an annular ring. The annular ring is attached to the stator core. A plurality of coil separators is supported by the annular ring, and extends from the annular ring axially along the longitudinal axis. One of the plurality of coil separators is disposed between each adjacent pair of the plurality of coils to prevent contact between adjacent coils having a different electrical phase.

A stator assembly for an electric machine is also provided. The stator assembly includes a stator core. The stator core extends along and is concentric about a longitudinal axis. A plurality of coils is supported by the stator core. The plurality of coils is disposed radially about and equidistant from the longitudinal axis, and extends along the longitudinal axis. Each adjacent pair of the plurality of coils is spaced from each other, and is configured for a different electrical phase. The stator assembly includes an insulator assembly. The insulator assembly defines a rigid form and includes a non-conductive material. The insulator assembly includes an annular ring attached to the stator core, and a plurality of coil separators supported by the annular ring and extending from the annular ring axially along the longitudinal axis. One of the plurality of coil separators is disposed between each adjacent pair of the plurality of coils to prevent contact between adjacent coils having a different electrical phase. The stator assembly further includes an attachment mechanism for attaching the insulator assembly to the stator core. The attachment mechanism aligns the insulator assembly concentrically about the longitudinal axis and positions each of the plurality of coil separators between one of the adjacent pairs of the plurality of coils.

A method of assembling a stator assembly for an electric machine is also provided. The method includes winding a wire around each of a plurality of bobbins of a stator core to define a plurality of coils. The coils are disposed radially about and equidistant from the longitudinal axis, and extend along the longitudinal axis. An insulator assembly is slideably inserted into the stator core. The insulator assembly includes an annular ring disposed perpendicularly relative to the longitudinal axis and a plurality of coil separators disposed parallel with the longitudinal axis and attached to the annular ring. The insulator assembly is inserted into the stator core such that one of the coil separators is disposed between each adjacent pair of the plurality of coils. The annular ring is attached to the stator core. The annular ring positions each of the coil separators between one of the adjacent pairs of the plurality of coils.

Accordingly, the coil separators of the insulator assembly may be slid between the adjacent pairs of the coils to maintain the separation between the coils and prevent coils of differing electrical phases from contacting each other. The rigid form of the insulator assembly allows for the coil separators to be slideably inserted between the coils, with the annular ring supporting and positioning the coil separators, thereby providing an easily assembled, highly repeatable and cost effective method of assembling the stator assembly.

The above features and advantages and other features and advantages of the present invention are readily apparent from the following detailed description of the best modes for carrying out the invention when taken in connection with the accompanying drawings.

DETAILED DESCRIPTION

Figure 1:
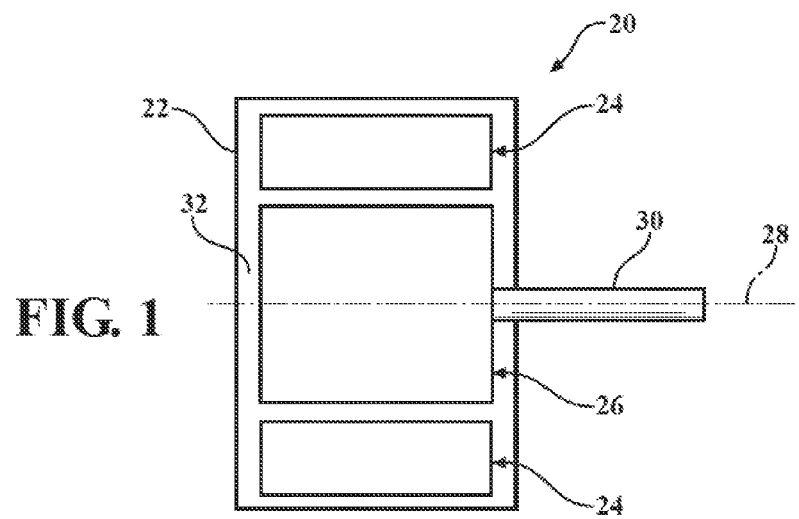
FIG. 1 is a schematic cross sectional view of an electric machine.

Referring to the Figures, wherein like numerals indicate like parts throughout the several views, an electric machine is shown generally at 20 in FIG. 1. The electric machine 20 may include but is not limited to a poly-phase electric motor or some other similar machine. Referring to FIG. 1, the electric machine 20 includes a housing 22 supporting a stator assembly 24. A rotor assembly 26 is rotatably attached to the housing 22 for rotation about a longitudinal axis 28 relative to the housing 22 and the stator assembly 24. A shaft 30 is attached to the rotor assembly 26 for rotation with the rotor assembly 26 about the longitudinal axis 28. As shown, the rotor assembly 26 is disposed within a central opening 32 of the stator assembly 24, and is concentric with the stator assembly 24 about the longitudinal axis 28. While FIG. 1 depicts a typical electric machine 20, it should be appreciated that the electric machine 20 may be configured in some other manner, such as for example, with the rotor assembly 26 disposed annularly outside an outer periphery of the stator assembly 24. Accordingly, the scope of the claims should not be limited to the specific configuration of the electric machine 20 shown and described herein.

Figure 2:
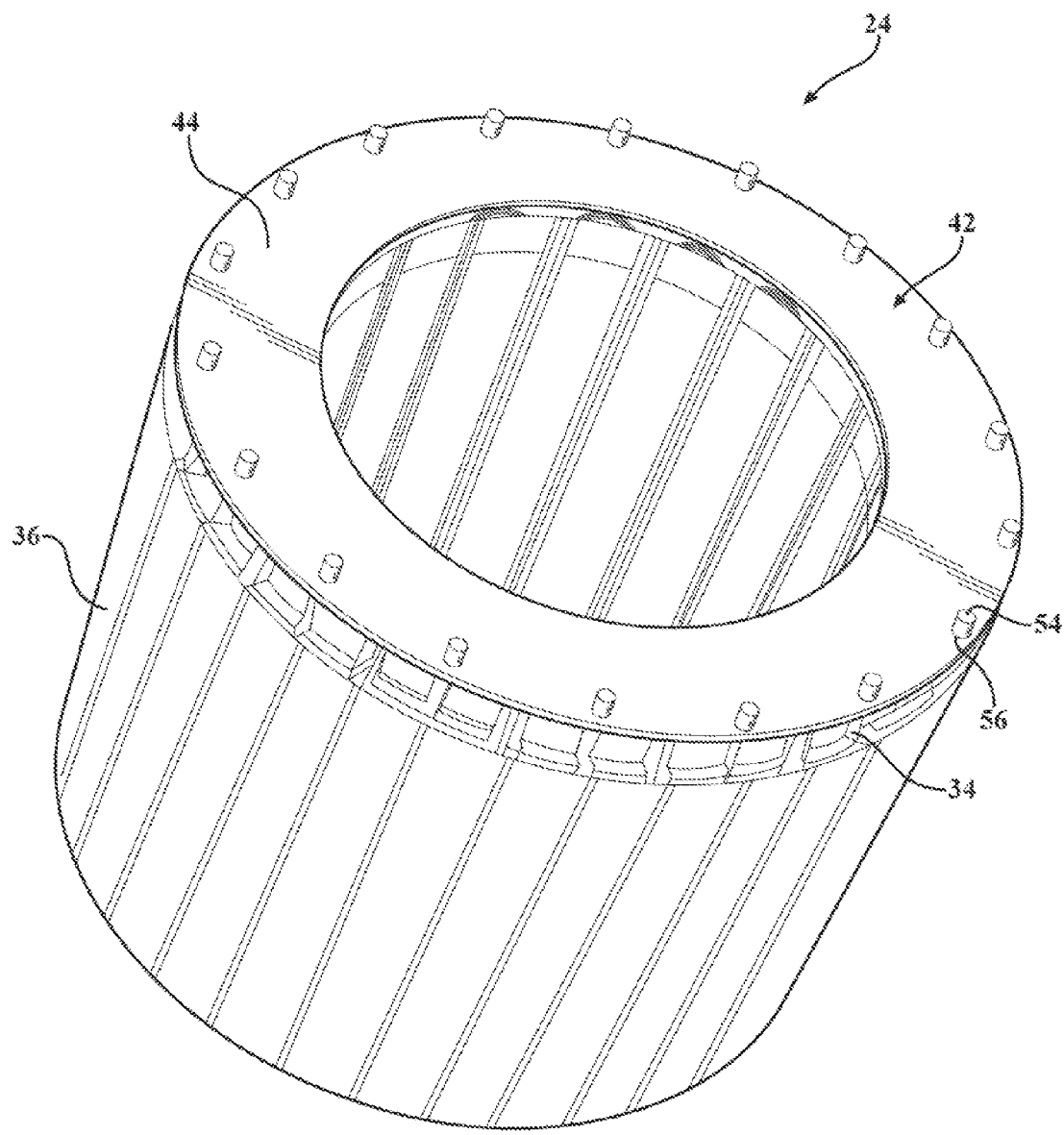
FIG. 2 is a schematic perspective view of a stator assembly for the electric machine.
Figure 3:
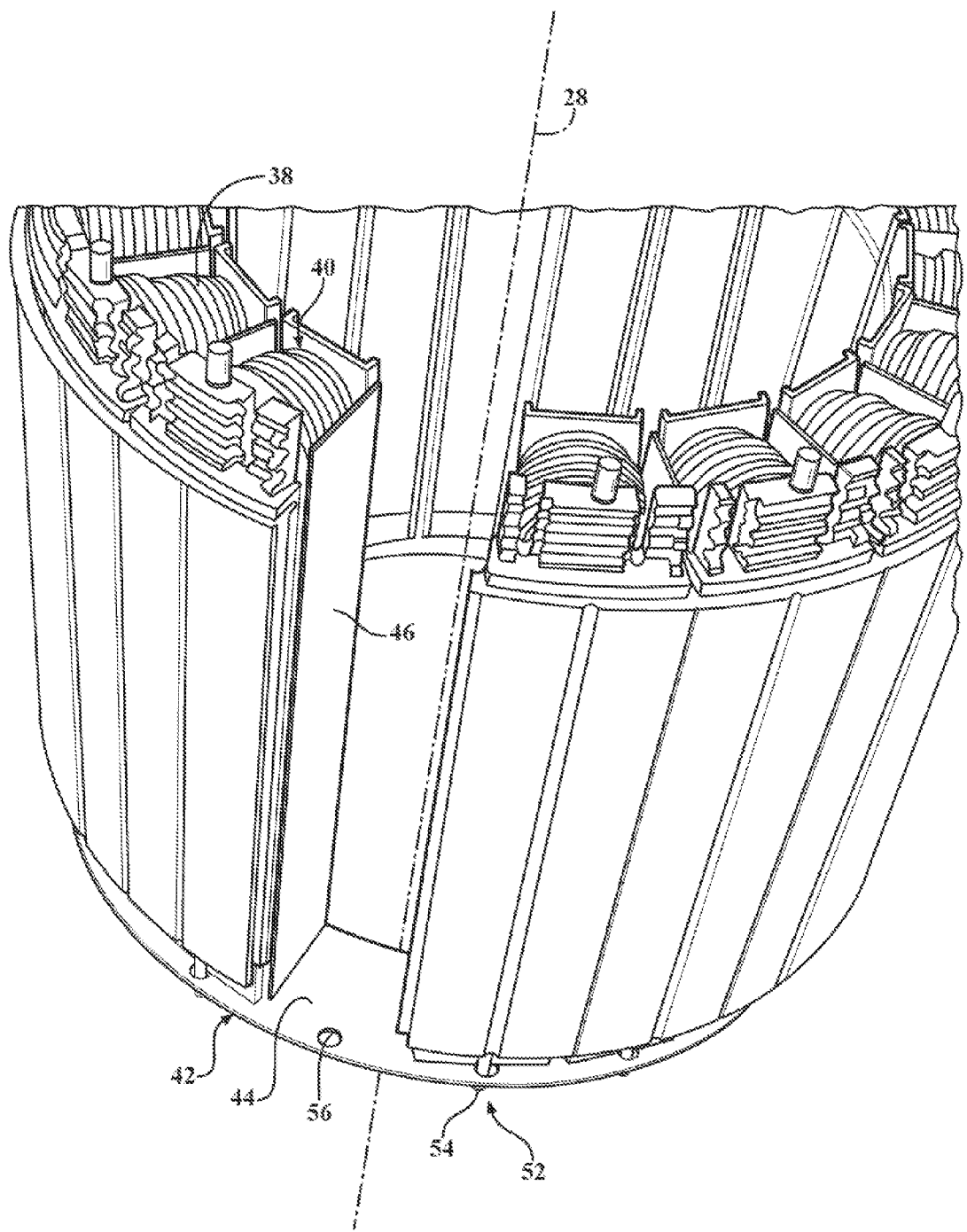
FIG. 3 is a schematic fragmentary perspective view of the stator assembly showing the insulator assembly disposed between adjacent coils of the stator assembly.

Referring to FIGS. 2 and 3, the stator assembly 24 includes a stator core 34 disposed within a sleeve 36. The stator core 34 extends along and is concentric with the longitudinal axis 28. The stator core 34 supports a plurality of bobbins (not shown), which extend along and parallel with the longitudinal axis 28.

The bobbins are disposed radially about and equidistant from the longitudinal axis 28. A wire 38 is wound around each of the bobbins to define a plurality of coils 40. Accordingly, the coils 40 are supported by the stator core 34, are disposed radially about and equidistant from the longitudinal axis 28, and extend along the longitudinal axis 28.

Each adjacent pair of the plurality of coils 40 is spaced from each other, with adjacent pairs of the coils 40 configured for a different electrical phase. For example, if the electric machine 20 includes a three phase electric machine 20, then the coils 40 may include a set of first phase coils, a set of second phase coils and a set of third phase coils. The coils 40 may be arranged such that all of the first phase coils are disposed between an adjacent second phase coil and an adjacent third phase coil, all of the second phase coils are disposed between an adjacent first phase coil and an adjacent third phase coil, and all of the third phase coils are disposed between an adjacent first phase coil and an adjacent second phase coil. The coils 40 of differing electrical phases must be separated from and not contact each other to prevent a phase-to-phase short.

Figure 4:
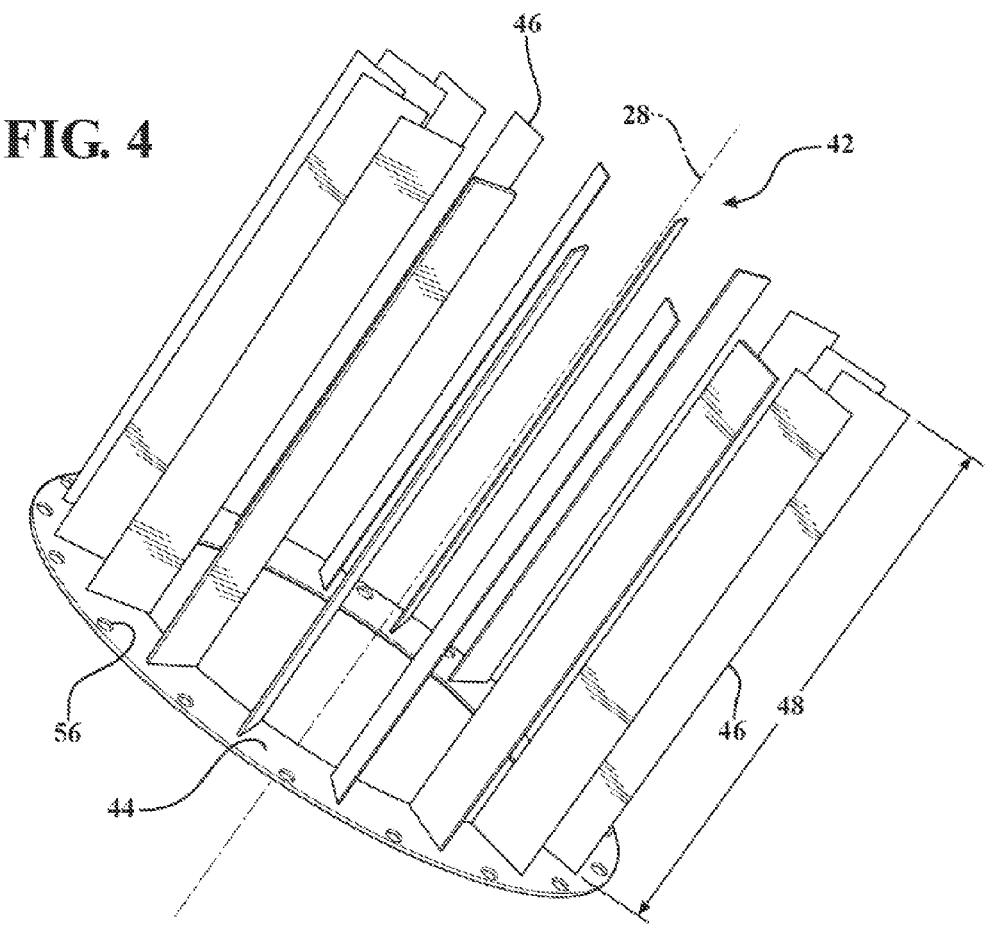
FIG. 4 is a schematic perspective view of an insulator assembly of the stator assembly.

Referring also to FIG. 4, the stator assembly 24 further includes an insulator assembly 42. The insulator assembly 42 includes an annular ring 44 and a plurality of coil separators 46. The annular ring 44 includes a circular shape that is concentric with the stator assembly 24 about the longitudinal axis 28. The plurality of coil separators 46 includes a planar, generally rectangular shape that is arranged perpendicularly relative to the annular ring 44 along the longitudinal axis 28. Each of the coil separators 46 include an axial length 48 measured parallel with and along the longitudinal axis 28 that is equal to or greater than an axial length of each of the plurality of coils 40. The annular ring 44 and the plurality of coil separators 46 include and are manufactured from a non-conductive material. For example, the annular ring 44 and the coil separators 46 may include a polymer material, such as a plastic. However, it should be appreciated that the non-conductive material may include some other material.

The coil separators 46 are supported by the annular ring 44, and extend from the annular ring 44 axially along the longitudinal axis 28. The annular ring 44 and the plurality of coil separators 46 define a rigid form. As defined herein, the rigid form of the insulator assembly 42 includes a shape that is capable of maintaining form during assembly of the stator assembly 24 without substantial flexure when under its own weight.

The annular ring 44 is attached to the stator core 34, and positions each of the coils 40 such that one of the coil separators 46 is disposed between each adjacent pair of the coils 40. The coil separators 46 maintain the spacing between adjacent coils 40, and prevent contact between adjacent coils 40 having a different electrical phase. Additionally, the coil separators 46 provide insulation between adjacent pairs of coils 40.

The stator assembly 24, and more specifically the stator core 34, further includes an attachment mechanism 52. The attachment mechanism 52 attaches the insulator assembly 42 to the stator core 34. The attachment mechanism 52 aligns the insulator assembly 42 concentrically with the longitudinal axis 28 and positions each of the plurality of coil separators 46 between one of the adjacent pairs of the plurality of coils 40. As best shown in FIG. 2, the attachment mechanism 52 includes at least one peg 54, and preferably a plurality of pegs 54, extending axially along the longitudinal axis 28 from the stator core 34. The annular ring 44 defines at least one aperture 56, and preferably a plurality of apertures 56. Each of the apertures 56 in the annular ring 44 is aligned with and in sliding engagement with one of the pegs 54 on the stator core 34. The pegs 54 extend through the apertures 56 by material deformation, press fit engagement, or other in some other manner of engagement to secure the insulator assembly 42 to the stator core 34. It should be appreciated that the attachment mechanism 52 may include some other manner of connector, fastener, or interlocking engagement between the insulator assembly 42 and the stator assembly 24 other than that shown and described herein, that is capable of attaching the insulator assembly 42 to the stator core 34, and aligning the coil separators 46 within the spacing between the adjacent coils 40.

A method of assembling the stator assembly 24 for the electric machine 20 is also provided. The method includes attaching the plurality of coil separators 46 to the annular ring 44. The coil separators 46 may be integrally formed with and connected to the annular ring 44. Alternatively, the coil separators 46 may be separately formed apart from the annular ring 44 and then attached to the annular ring 44, such as through chemical bonding, or welding.

The method further includes winding the wire 38 around each of the plurality of bobbins of the stator core 34 to define the plurality of coils 40. The wires 38 may be wound around the bobbins in any suitable manner, and in any configuration. Preferably, the wires 38 are wound to define a high slot fill concentrated wound electric machine 20.

The method further includes slideably inserting the insulator assembly 42 into the stator core 34. The insulator assembly 42 is slideably inserted such that one of the coil separators 46 is disposed between each adjacent pair of the plurality of coils 40. Because the coil separators 46 are attached to the annular ring 44, and together define the rigid form of the insulator assembly 42, all of the coil separators 46 may be slideably inserted simultaneously into position to separate the adjacent coils 40 manually or with a robotic system, thereby providing a fast and convenient method of assembling the stator assembly 24.

The method further includes attaching the insulator assembly 42 to the stator core 34. Specifically, the annular ring 44 is attached to the stator core 34. Because the coil separators 46 are attached to and supported by the annular ring 44, and because the insulator assembly 42 defines the rigid form, the annular ring 44 easily positions and secures each of the coil separators 46 between one of the adjacent pairs of the plurality of coils 40 when attached to the stator core 34. The insulator assembly 42 may be attached to the stator assembly 24 in any suitable manner. As shown, the insulator assembly 42 is attached to the stator core 34 by pressing the annular ring 44 onto the pegs 54 such that the pegs 54 extend through the apertures 56 in the annular ring 44 in a press fit engagement to secure the annular ring 44 in position, and thereby securing the coil separators 46 in position as well.

While the best modes for carrying out the invention have been described in detail, those familiar with the art to which this invention relates will recognize various alternative designs and embodiments for practicing the invention within the scope of the appended claims.

The invention claimed is:

1. A stator assembly for an electric machine, the stator assembly comprising:
   a stator core extending along and concentric about a longitudinal axis;
   a plurality of coils supported by the stator core, disposed radially about and equidistant from the longitudinal axis and extending along the longitudinal axis;
   wherein each adjacent pair of the plurality of coils is spaced from each other and is configured for a different electrical phase;

an insulator assembly having an annular ring attached to the stator core and a plurality of coil separators supported by the annular ring and extending from the annular ring axially along the longitudinal axis, with one of the plurality of coil separators disposed between each adjacent pair of the plurality of coils to prevent contact between adjacent coils having a different electrical phase;

wherein the stator core includes an attachment mechanism for attaching the insulator assembly to the stator core; and wherein the attachment mechanism includes at least one peg extending axially along the longitudinal axis from the stator core, and the annular ring defines at least one aperture aligned with and in sliding engagement with the at least one peg, with the at least one peg extending through the at least one aperture in press fit engagement.

2. A stator assembly as set forth in claim 1 wherein the attachment mechanism aligns the insulator assembly concentrically with the longitudinal axis and positions each of the plurality of coil separators between one of the adjacent pairs of the plurality of coils.

3. A stator assembly as set forth in claim 1 wherein the annular ring and the plurality of coil separators include a non-conductive material.

4. A stator assembly as set forth in claim 3 wherein the non-conductive material includes a polymer material.

5. A stator assembly as set forth in claim 3 wherein the annular ring and the plurality of coil separators define a rigid form.

6. A stator assembly as set forth in claim 5 wherein each of the plurality of coil separators includes a planar shape arranged perpendicularly relative to the annular ring.

7. A stator assembly as set forth in claim 6 wherein each of the plurality of coil separators include an axial length along the longitudinal axis that is equal to or greater than an axial length of each of the plurality of coils.

8. A stator assembly for an electric machine, the stator assembly comprising;

a stator core extending along and concentric about a longitudinal axis;

a plurality of coils supported by the stator core, disposed radially about and equidistant from the longitudinal axis and extending along the longitudinal axis;

wherein each adjacent pair of the plurality of coils is spaced from each other and is configured for a different electrical phase;

an insulator assembly defining a rigid form and including a non-conductive material, the insulator assembly including an annular ring attached to the stator core and a plurality of coil separators supported by the annular ring and extending from the annular ring axially along the longitudinal axis, with one of the plurality of coil separators disposed between each adjacent pair of the plurality of coils to prevent contact between adjacent coils having a different electrical phase; and an attachment mechanism for attaching the insulator assembly to the stator core, wherein the attachment mechanism aligns the insulator assembly concentrically about the longitudinal axis and positions each of the plurality of coil separators between one of the adjacent pairs of the plurality of coils;

wherein the attachment mechanism includes at least one peg extending axially along the longitudinal axis from the stator core, and wherein the annular ring defines at least one aperture aligned with and in sliding engagement with the at least one peg, with the at least one peg extending through the at least one aperture.

9. A stator assembly as set forth in claim 8 wherein each of the plurality of coil separators includes a planar shape arranged perpendicularly relative to the annular ring.

10. A stator assembly as set forth in claim 9 wherein each of the plurality of coil separators include an axial length along the longitudinal axis that is equal to or greater than an axial length of each of the plurality of coils.

\* \* \* \* \*